(12) United States Patent
Noda

(10) Patent No.: US 11,721,821 B2
(45) Date of Patent: Aug. 8, 2023

(54) FUEL CELL SYSTEM AND METHOD FOR CONTROLLING FUEL CELL SYSTEM

(71) Applicant: NISSAN MOTOR CO., LTD., Yokohama (JP)

(72) Inventor: Tetsushi Noda, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 146 days.

(21) Appl. No.: 17/442,978

(22) PCT Filed: Mar. 27, 2019

(86) PCT No.: PCT/IB2019/000404
§ 371 (c)(1),
(2) Date: Sep. 24, 2021

(87) PCT Pub. No.: WO2020/194019
PCT Pub. Date: Oct. 1, 2020

(65) Prior Publication Data
US 2022/0190368 A1 Jun. 16, 2022

(51) Int. Cl.
*H01M 8/04* (2016.01)
*H01M 8/04701* (2016.01)
(Continued)

(52) U.S. Cl.
CPC ..... *H01M 8/04738* (2013.01); *H01M 8/0438* (2013.01); *H01M 8/04462* (2013.01);
(Continued)

(58) Field of Classification Search
CPC .......... H01M 8/0438; H01M 8/04462; H01M 8/04589; H01M 8/04738; H01M 8/0606
See application file for complete search history.

(56) References Cited

U.S. PATENT DOCUMENTS

| 2011/0217607 A1 | 9/2011 | Isom |
| 2016/0156050 A1 | 6/2016 | Maruyama et al. |
| 2018/0309145 A1 | 10/2018 | Zhang et al. |

FOREIGN PATENT DOCUMENTS

| CN | 109860660 A | * | 6/2019 |
| EP | 0 973 219 B1 | | 4/2007 |

(Continued)

OTHER PUBLICATIONS

Machine translation of JP 2016-207378 (no date).*

*Primary Examiner* — Amanda C. Walke
(74) *Attorney, Agent, or Firm* — Foley & Lardner LLP

(57) ABSTRACT

Provided is a method of controlling a fuel cell system having a fuel cell stack, a reformer configured to reform a raw fuel and supply the reformed raw fuel to the fuel cell stack, a fuel flow rate control unit configured to control a flow rate of the raw fuel supplied to the reformer, an air supply pipe configured to supply oxygen to the raw fuel, and a combustor configured to mix a cathode discharged gas and an anode discharged gas discharged from the fuel cell stack and combust the mixed gas. The method of controlling the fuel cell system includes detecting at least one of a current value generated from the fuel cell stack and an oxygen supply amount supplied from the air supply pipe; estimating a composition of the anode discharged gas on the basis of at least one of the current value and the oxygen supply amount; and controlling a temperature of the combustor by adjusting the flow rate of the raw fuel using the fuel flow rate control unit on the basis of the estimated composition of the anode discharged gas.

9 Claims, 7 Drawing Sheets

(51) Int. Cl.
*H01M 8/0438* (2016.01)
*H01M 8/0444* (2016.01)
*H01M 8/04537* (2016.01)
*H01M 8/0606* (2016.01)

(52) U.S. Cl.
CPC ..... *H01M 8/04589* (2013.01); *H01M 8/0606* (2013.01); *H01M 2250/20* (2013.01)

(56) References Cited

FOREIGN PATENT DOCUMENTS

| | | | |
|---|---|---|---|
| JP | 2016-111004 A | | 6/2016 |
| JP | 2016207378 A | * | 12/2016 |
| JP | 2018147736 A | * | 9/2018 |
| JP | 2018-186079 A | | 11/2018 |
| WO | WO-2019172337 A1 | * | 9/2019 ............. C01B 3/384 |

* cited by examiner

FUEL CELL SYSTEM AND METHOD FOR CONTROLLING FUEL CELL SYSTEM

TECHNICAL FIELD

The present invention relates to a fuel cell system and a method for controlling the fuel cell system.

BACKGROUND ART

JP2016-111004A discloses a fuel cell system provided with a combustor that generates a combustion gas by combusting an anode discharged gas used in a fuel cell. In this fuel cell system, in order to control a gas temperature of the combustor to a target temperature, the temperature of the combustion gas is detected using a temperature sensor, and a flow rate of the fuel is controlled such that the detected temperature becomes the target temperature.

SUMMARY OF INVENTION

However, in the control of the gas temperature of the combustor using the temperature sensor, when the discharged gas is combusted at a high temperature, the temperature sensor possibly does not withstand the high temperature and may be failed. For example, in a fuel cell such as a solid oxide fuel cell (SOFC) in which the gas temperature of the combustor is constantly high during operation, it is difficult to control the gas temperature of the combustor using the temperature sensor. If the gas temperature of the combustor is not controlled accurately, there is a risk of causing deterioration of a combustion catalyst (such as sintering) due to an excessively high combustion gas temperature, degradation of startability or generation performance of the fuel cell due to an excessively low combustion gas temperature, and the like.

In view of the aforementioned problems, an object of the present invention is to provide a fuel cell system capable of accurately controlling the gas temperature of the combustor without using the temperature sensor configured to detect the temperature of the combustion gas.

According to an aspect of the present invention, a method of controlling a fuel cell system is provided, the fuel cell system having a fuel cell stack, a reformer configured to reform a raw fuel and supply the reformed raw fuel to the fuel cell stack, a fuel flow rate control unit configured to control a flow rate of the raw fuel supplied to the reformer, an air supply pipe configured to supply oxygen to the raw fuel, and a combustor configured to mix a cathode discharged gas and an anode discharged gas discharged from the fuel cell stack and combust the mixed gas. The method of controlling the fuel cell system includes detecting at least one of a current value generated from the fuel cell stack and an oxygen supply amount supplied from the air supply pipe, estimating a composition of the anode discharged gas on the basis of at least one of the current value and the oxygen supply amount, and controlling a temperature of the combustor by adjusting the flow rate of the raw fuel using the fuel flow rate control unit on the basis of the estimated composition of the anode discharged gas.

DESCRIPTION OF EMBODIMENTS

Embodiments of the present invention will now be described with reference to the accompanying drawings and the like.

First Embodiment

Figure 1:
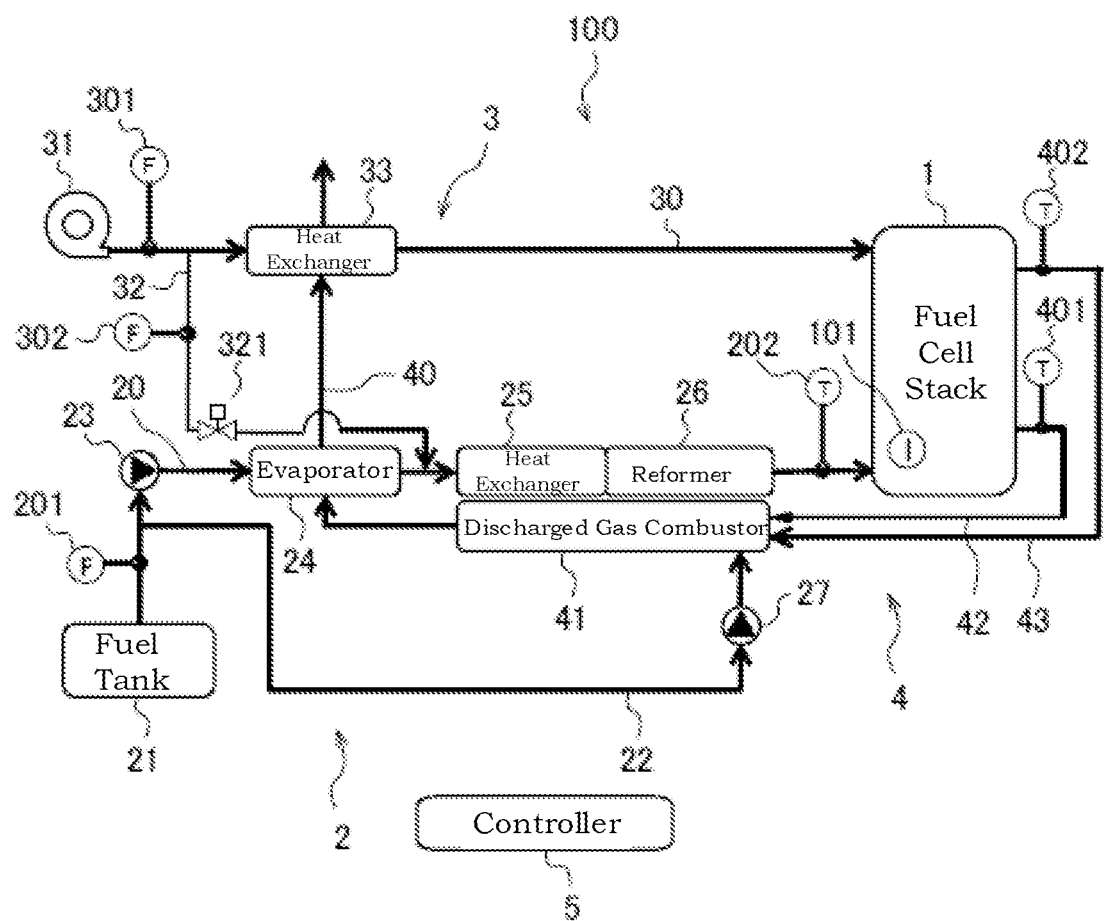
FIG. 1 is a schematic configuration diagram illustrating a main configuration of a fuel cell system according to a first embodiment.

FIG. 1 is a schematic configuration diagram illustrating a main configuration of a fuel cell system 100 according to a first embodiment.

The fuel cell system 100 is a system that supplies a fuel gas (anode gas) and an oxidant gas (cathode gas) necessary for power generation to a fuel cell stack 1 and causes the fuel cell stack 1 to generate power depending on an electric load of an electric motor configured to travel a vehicle or the like.

The fuel cell system 100 includes the fuel cell stack 1, an anode supply mechanism 2, a cathode supply mechanism 3, a discharge mechanism 4, and a drive mechanism (not shown). The anode supply mechanism 2 supplies the fuel cell stack 1 with the anode gas, and the cathode supply mechanism 3 supplies the fuel cell stack 1 with the cathode gas. The discharge mechanism 4 discharges an anode discharged gas and a cathode discharged gas output from the fuel cell stack 1. The drive mechanism obtains power by extracting electric power from the fuel cell stack 1. In addition, the fuel cell system 100 has a controller 5 (control unit) that controls operations of the entire system.

The fuel cell stack 1 generates electric power by receiving the supplied anode and cathode gases. The fuel cell stack 1 is formed by laminating a plurality of fuel cells or unit fuel cells, and each fuel cell as a power source is, for example, a solid oxide fuel cell (SOFC).

The fuel cell stack 1 is supplied with the anode gas from the anode supply mechanism 2 and the cathode gas from the cathode supply mechanism 3. In addition, the anode discharged gas and the cathode discharged gas produced after an electrochemical reaction are combusted by a discharged gas combustor 41 (combustor) described below to produce a combustion gas, and the combustion gas is discharged to the outside through a combustion gas passage 40.

Note that the fuel cell stack 1 is preferably provided with a current sensor 101. The current sensor 101 detects a current value of the generated current extracted from the fuel cell stack 1. The current sensor 101 outputs the detected current value as a signal to the controller 5.

The anode supply mechanism 2 has a fuel supply passage 20, and the fuel supply passage 20 has a fuel tank 21, a branching passage 22, an injector 23, an evaporator 24, a heat exchanger 25, and a reformer 26 in this order from the upstream. The branching passage 22 further has an injector 27. The fuel supply passage 20 is a passage for supplying the anode gas to the anode electrode of the fuel cell stack 1 and connects the fuel tank 21 and the anode flow path provided in the fuel cell stack 1.

The fuel tank 21 stores, for example, a fuel containing methane and water as main components as a pre-reform raw fuel. The raw fuel is supplied from the fuel tank 21 to the injector 23 (fuel flow rate control unit) by a pump (fuel flow rate control unit) (not shown), and is injected and supplied to the evaporator 24 by adjusting the amount of the raw fuel to a predetermined injection amount using the injector 23. Note that the output control of the pump and the adjustment of the injection amount of the injector 23 can be executed by the controller 5.

The branching passage 22 is a passage configured to supply a combustion fuel to the discharged gas combustor 41 described below during a warm-up control or the like of the fuel cell system 100. The injector 27 is provided in the branching passage 22, and a liquid fuel is also supplied from the fuel tank 21 to the injector 27, for example, during the warm-up control of the fuel cell system 100. The liquid fuel supplied to the injector 27 is injected and supplied to the discharged gas combustor 41 by the injector 27 as a combustion fuel. The control of the injection amount of the injector 27 may be executed by the controller 5.

Note that it is preferable that a flow rate sensor 201 (fuel flow rate detecting means) is provided at a position between the fuel tank 21 and the branching passage 22 in the fuel supply passage 20. The flow rate sensor 201 (fuel flow rate detecting means) detects a fuel flow rate, and the detection value is transmitted to the controller 5 as a signal.

The evaporator 24 heats the liquid fuel injected and supplied from the injector 23 through atomization to produce a pre-reform fuel gas containing ethanol gas and water vapor. The evaporator 24 vaporizes the fuel by utilizing the heat of the combustion gas discharged from the discharged gas combustor 41 described below.

The heat exchanger 25 further heats the pre-reform fuel gas vaporized by the evaporator 24 by exchanging heat between the combustion gas from the discharged gas combustor 41 and the pre-reform fuel gas.

The reformer 26 reforms the pre-reform fuel gas to obtain an appropriate state for supplying it to the fuel cell stack 1. For example, the reformer 26 steam-reforms the pre-reform fuel gas with a reforming catalyst (not shown) to produce an anode gas containing hydrogen as a main component. The anode gas reformed in this way is supplied to the anode flow path of the fuel cell stack 1 still in a high temperature state.

Note that it is preferable that a temperature sensor 202 (reforming gas temperature detecting means) is provided at a position between the reformer 26 and the fuel cell stack 1 in the fuel supply passage 20. The temperature sensor 202 detects a temperature of the anode gas (reformed raw fuel) supplied to the fuel cell stack 1, and the detection value is transmitted to the controller 5 as a signal.

Next, the cathode supply mechanism 3 will be described.

The cathode supply mechanism 3 has an air supply passage 30, and the air supply passage 30 has an air blower 31, a POX pipe 32 (air supply pipe), and a heat exchanger 33 in this order from the upstream. The air supply passage 30 is a passage for supplying air as a cathode gas to the cathode electrode of the fuel cell stack 1, and connects the air blower 31 and the cathode flow path provided in the fuel cell stack 1.

The air blower 31 is provided at an inlet of the air supply passage 30 to receive external air (air) through a filter (not shown) and pumps the received air into the air supply passage 30. A flow rate of the air (cathode gas flow rate) output from the air blower 31 may also be controlled by the controller 5.

In addition, it is preferable that a flow rate sensor 301 (cathode gas flow rate detecting means) is provided at a position between the air blower 31 and the POX pipe 32 in the air supply passage 30. The flow rate sensor 301 detects the cathode gas flow rate, and the detection value is transmitted to the controller 5 as a signal.

The POX pipe 32 is an air supply pipe that supplies the air (oxygen) to the raw fuel of the fuel supply passage 20. The POX pipe 32 is connected to couple a downstream location of the air blower 31 of the air supply passage 30 and an upstream location of the heat exchanger 25 of the fuel supply passage 20.

The POX pipe 32 is provided with a throttle 321. The throttle 321 is controlled by the controller 5 to adjust the air flow rate supplied to the fuel cell stack 1 via the heat exchanger 33 depending on an opening degree of the throttle 321 and the air flow rate supplied to the fuel supply passage 20. For example, during a system warm-up operation, the air is supplied from the air blower 31 to the fuel supply passage 20. The air supplied to the fuel supply passage 20 in this way is fed to the reformer 26 via the heat exchanger 25, so that the air and the fuel in the reformer 26 are combusted, and the combustion gas promotes the warm-up operation.

Note that it is preferable that the POX pipe 32 is provided with a flow rate sensor 302. The flow rate sensor 302 detects a flow rate of the oxygen (POX flow rate) supplied to the raw fuel of the fuel supply passage 20 through the POX pipe 32, and the detection value is transmitted to the controller 5 as a signal.

The heat exchanger 33 is a device that thermally exchanges the air supplied by the air blower 31 with the combustion gas produced by the discharged gas combustor 41 described below to heat the air. The air heated by the heat exchanger 33 is supplied to the cathode flow path of the fuel cell stack 1.

Next, the discharge mechanism 4 will be described.

The discharge mechanism 4 has an anode discharged gas passage 42, a cathode discharged gas passage 43, the discharged gas combustor 41 (combustor), and the combustion gas passage 40. The anode discharged gas passage 42 and the cathode discharged gas passage 43 connect the discharged gas combustor 41 to the fuel cell stack 1. In addition, the discharged gas combustor 41 is connected to the combustion gas passage 40 that discharges the combustion gas produced in the discharged gas combustor 41 to the outside.

One end of the anode discharged gas passage 42 is connected to an anode flow path outlet of the fuel cell stack 1, and the other end is connected to the discharged gas combustor 41. The anode discharged gas passage 42 is a passage that outputs the anode discharged gas subjected to a power generation reaction and discharged from the fuel cell stack 1 to the discharged gas combustor 41.

It is preferable that a temperature sensor 401 (anode discharged gas temperature detecting means) is provided in the vicinity of the anode flow path outlet (anode electrode side outlet) of the fuel cell stack 1 in the anode discharged gas passage 42. The temperature sensor 401 detects the temperature of the anode discharged gas discharged from the fuel cell stack 1, and the detection value is transmitted to the controller 5 as a signal.

One end of the cathode discharged gas passage 43 is connected to a cathode flow path outlet of the fuel cell stack 1, and the other end is connected to the discharged gas combustor 41. The cathode discharged gas passage 43 is a passage that outputs the cathode discharged gas subjected to a power generation reaction and discharged from the fuel cell stack 1 to the discharged gas combustor 41.

It is preferable that a temperature sensor 402 (cathode discharged gas temperature detecting means) is provided in the vicinity of the cathode flow path outlet (cathode electrode side outlet) of the fuel cell stack 1 in the cathode discharged gas passage 43. The temperature sensor 402 detects the temperature of the cathode discharged gas discharged from the fuel cell stack 1, and the detection value is transmitted to the controller 5 as a signal.

In the discharged gas combustor 41, the anode discharged gas and the cathode discharged gas delivered from the fuel cell stack 1 through the anode discharged gas passage 42 and the cathode discharged gas passage 43 are mixed, and the mixed gas is catalytically combusted to produce a combustion gas containing carbon dioxide and water as main components. The combustion gas produced by the discharged gas combustor 41 is discharged from the combustion gas passage 40 to the outside of the fuel cell system 100.

In addition, the discharged gas combustor 41 is arranged adjacent to the heat exchanger 25 and the reformer 26, and the heat generated by the catalytic combustion of the discharged gas combustor 41 heats the heat exchanger 25 and the reformer 26.

The combustion gas passage 40 is a passage that discharges the combustion gas produced by the discharged gas combustor 41 to the outside, and one end thereof is connected to the discharged gas combustor 41. The other end side of the combustion gas passage 40 communicates with the external air via the evaporator 24 of the anode supply mechanism 2 and the heat exchanger 33 of the cathode supply mechanism 3. The evaporator 24 and the heat exchanger 33 are heated by heat exchange with the heat of the combustion gas passing through the combustion gas passage 40.

During the warm-up control of the fuel cell system 100, raw fuel is injected and supplied to the discharged gas combustor 41 via the injector 27. The discharged gas combustor 41 is warmed up by catalytically combusting the raw fuel injected and supplied to the discharged gas combustor 41, and the evaporator 24 or the heat exchanger 33 are warmed up by the combustion gas produced by the discharged gas combustor 41.

Next, the controller 5 will be described.

The controller 5 includes a general-purpose electronic circuit such as a microcomputer, a microprocessor, and a CPU, and peripheral devices, and implements a process for controlling the fuel cell system 100 by executing a specific program.

For example, the controller 5 estimates a concentration f_anodegas of the anode discharged gas flowing through the anode discharged gas passage 42, and computes a target fuel flow rate (flow rate of the raw fuel) F_fuel on the basis of the estimated anode discharged gas concentration f_anodegas such that the combustion gas produced by the discharged gas combustor 41 reaches a target combustion temperature. In addition, the controller 5 controls the combustion gas temperature of the discharged gas combustor 41 by adjusting the injection amount of the injector 23 to regulate the flow rate of the raw fuel on the basis of the computation result. Note that the anode discharged gas concentration referred to herein is a concentration of each material contained in the anode discharged gas.

As described below, the anode discharged gas concentration f_anodegas is estimated on the basis of at least one of the current value of the fuel cell stack 1 and the oxygen supply amount (POX flow rate) supplied from the POX pipe 32 to the fuel supply passage 20.

Figure 2:
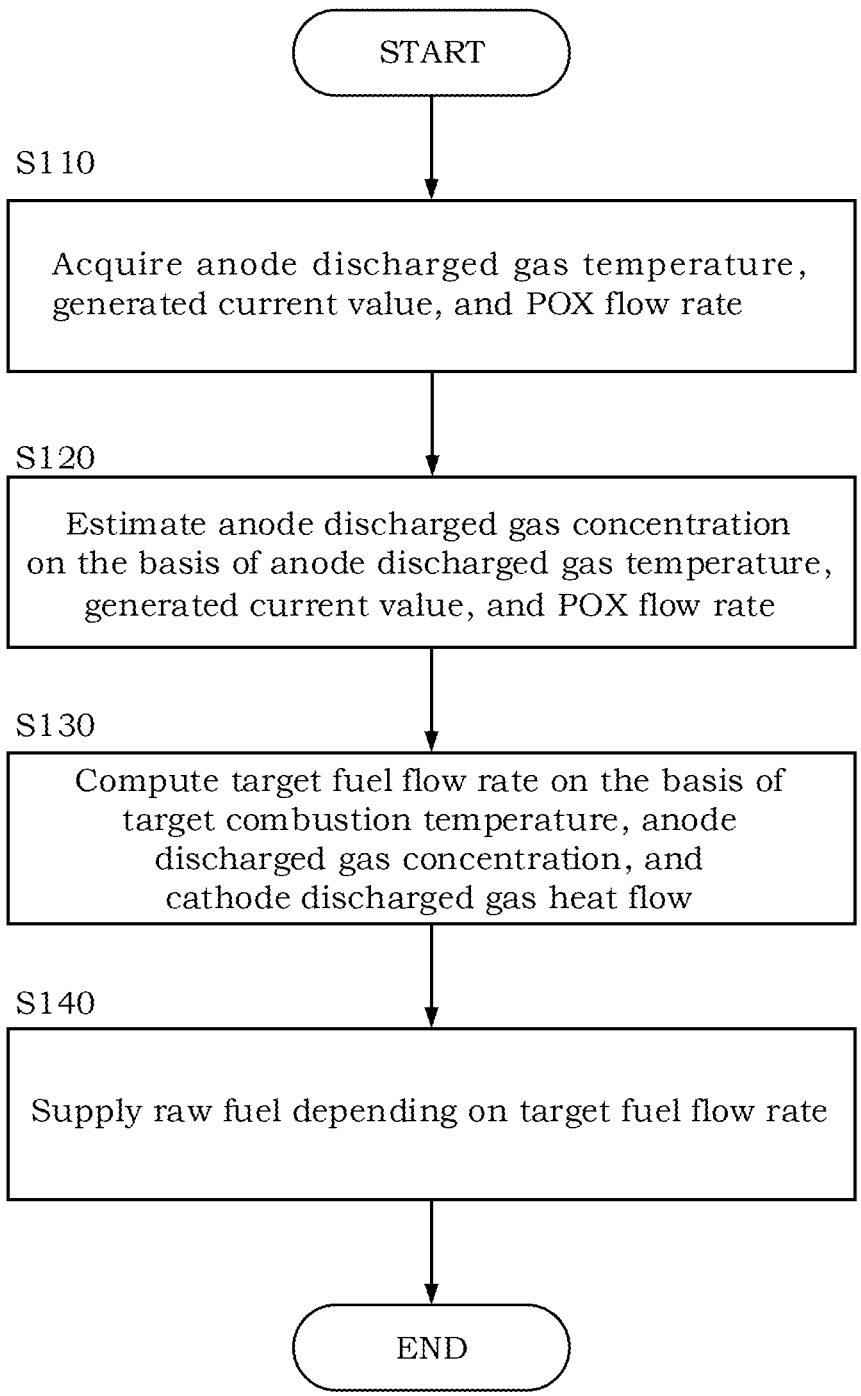
FIG. 2 is a flowchart illustrating combustion gas temperature control of the fuel cell system according to the first embodiment.

FIG. 2 is a flowchart illustrating combustion gas temperature control of the fuel cell system 100 according to the present embodiment. Note that all of the following controls are repeatedly executed by the controller 5.

As the fuel cell system 100 starts the combustion gas temperature control, the controller 5 obtains the anode discharged gas temperature, the generated current value, and the POX flow rate in step S110.

While the anode discharged gas temperature is a temperature of the anode discharged gas subjected to the power generation reaction and discharged from the fuel cell stack 1, it may be estimated as a value equivalent to the cathode discharged gas temperature. According to the present embodiment, the cathode discharged gas temperature is a predetermined value arbitrarily set depending on the operating condition of the system, and the anode discharged gas temperature is also a predetermined value arbitrarily set.

The generated current value is a current value of the generated current extracted from the fuel cell stack 1, and is detected by the current sensor 101 provided in the fuel cell stack 1. The detection value is transmitted to the controller 5 as a signal, and the controller 5 receives the signal.

Note that the generated current value acquired by the controller 5 does not necessarily have to be a detection value, and may be a target value of the generated current set on the basis of the operating condition of the system.

The POX flow rate is an oxygen supply amount supplied from the air supply passage 30 to the raw fuel of the fuel supply passage 20 through the POX pipe 32. The POX flow rate is detected by the flow rate sensor 302 provided in the POX pipe 32. The detection value is transmitted to the controller 5 as a signal, and the controller 5 receives the signal.

Note that the POX flow rate does not necessarily have to be a detection value, and may be estimated from the flow rate of the air (cathode gas flow rate) output from the air blower 31, an opening degree of the throttle 321, and a pressure loss caused by the POX pipe 32. Here, since the flow rate of the air (cathode gas flow rate) output from the air blower 31 can be controlled by the controller 5, according to the present embodiment, a predetermined value arbitrarily set depending on the operating condition of the system is used.

As described above, both the POX flow rate and the generated current value may be given as target values or estimated values without detection. However, in order to improve estimation accuracy of the anode discharged gas concentration described below, it is preferable that at least one of the POX flow rate and the generated current value is acquired as a detection value in the present embodiment.

Next, in step S120, the controller 5 estimates concentrations of respective substances contained in the anode discharged gas (anode discharged gas composition and anode discharged gas concentration) on the basis of the anode discharged gas temperature, the generated current value, and the POX flow rate acquired in step S110. Specifically, the anode discharged gas concentration may be estimated from the known composition of the raw fuel, the amount of oxygen supplied to the fuel, and the anode discharged gas temperature, for example, using an equilibrium composition.

The composition of the raw fuel is known and includes, for example, $CH_4$ or $H_2O$.

The amount of oxygen supplied to the fuel is a sum of the amount of oxygen supplied to the raw fuel from the POX pipe 32 and the amount of oxygen that reacts with the anode gas in the fuel cell stack 1. The POX flow rate is acquired in step S110, and the amount of oxygen that reacts with the anode gas may be estimated from the generated current value acquired in step S110.

As the anode discharged gas temperature, the value acquired in step S110 may be used.

For example, consider a case where the composition of the raw fuel is $H_2O$ as an example. When the composition of the raw fuel is $H_2O$, the following chemical reaction formula (Formula (1)) is given.

[Formula 1]

$$H_2O \leftrightharpoons H_2 + \tfrac{1}{2}O_2 \qquad (1)$$

Next, from the following Formula (2), a partial pressure $P_{H2o}$, a partial pressure $P_{H2}$, and a partial pressure $P_{O2}$ of each composition (here, $H_2O$, $H_2$, $O_2$) are determined such that an equilibrium constant Kp determined mainly from the temperature are satisfied. The concentrations of respective compositions of the anode discharged gas (anode discharged gas concentration) are determined on the basis of the partial pressures.

[Formula 2]

$$K_p = \frac{P_{H_2} + P_{O_2}^{\frac{1}{2}}}{P_{H_2O}} \qquad (2)$$

In this manner, the anode discharged gas concentration (anode discharged gas composition) may be estimated from the known raw fuel composition on the basis of the POX flow rate, the generated current value, and the anode discharged gas temperature.

Note that the estimation of the concentration of the anode discharged gas is not necessarily limited to using the equilibrium composition, and may be estimated, for example, using a reaction rate formula based on a rate constant.

In addition, although the estimation of the concentration of the anode discharged gas can be obtained from a thermodynamic calculation formula such as the equilibrium composition and the reaction rate formula as described above, the estimation is not necessarily limited thereto. The estimation may be performed using actual machine evaluation based on experiments.

Next, in step S130, the controller 5 computes a target fuel flow rate F_fuel [mol/s] such that the combustion temperature of the combustion gas of the discharged gas combustor 41 becomes the target combustion temperature. The target fuel flow rate F_fuel may be computed on the basis of the target combustion temperature, the anode discharged gas concentration, and a heat flow of the cathode discharged gas.

Specifically, the fuel flow rate F_fuel can be obtained from the following Formulas (3) and (4) based on enthalpy. In Formulas (3) and (4), "H_anodegas [W]" denotes a heat flow of the anode discharged gas (enthalpy of the anode discharged gas), and "H_cathodegas [W]" denotes the heat flow of the cathode discharged gas (enthalpy of the cathode discharged gas). In addition, "F_exh [mol/s]" denotes a discharged gas flow rate, "α" denotes a flow rate ratio between the fuel and the anode discharged gas, "h_exh [W/mol/s]" denotes a heat flow per unit flow rate of the combustion gas, and "h_anodegas [W/mol/s]" denotes a heat flow per unit flow rate of the anode discharged gas.

[Formula 3]

$$H_{\_anodegas} + H_{\_cathodegas} = F_{\_exh} * h_{\_exh} \qquad (3)$$

[Formula 4]

$$H_{\_anodegas} = F_{\_fuel} * \alpha * h_{\_anodegas} \qquad (4)$$

The heat flow H_cathodegas [W] of the cathode discharged gas is determined from the following Formula (5) using a cathode gas flow rate F_air [mol/s], a specific heat Cp_air of the air, and a temperature rise ΔT.

[Formula 5]

$$F_{\_air} * C_{p\_air} * \Delta T = H_{\_cathodegas} \qquad (5)$$

The cathode gas flow rate F_air is a flow rate of the air output from the air blower 31. As described above, since the flow rate of the air output from the air blower 31 can be controlled by the controller 5, according to the present embodiment, a predetermined value arbitrarily set depending on the operating condition of the system is used.

The specific heat Cp_air of the air is a fixed value. In addition, the temperature rise ΔT is a value obtained by subtracting the atmospheric temperature from the temperature of the cathode discharged gas (cathode discharged gas temperature) subjected to the power generation reaction and discharged from the fuel cell stack 1. As described above, according to the present embodiment, the cathode discharged gas temperature is obtained using a predetermined value arbitrarily set depending on the operating condition of the system.

As described above, according to the present embodiment, both the cathode gas flow rate F_air and the temperature rise ΔT are obtained using arbitrary set values. In addition, since the specific heat Cp_air of the air is a fixed value, the cathode discharged gas heat flow H_cathodegas is given as a predetermined value arbitrarily set depending on the operating condition of the system.

Returning to Formulas (3) and (4), the discharged gas flow rate F_exh [mol/s] is a gas flow rate after combustion by the discharged gas combustor 41. The discharged gas flow rate F_exh is determined from the cathode gas flow rate F_air and the fuel flow rate supplied from the fuel tank 21 to the fuel supply passage 20, and is calculated here, for example, on the premise of complete combustion. As described above, according to the present embodiment, the cathode gas flow rate F_air is obtained using a predetermined value arbitrarily set depending on the operating condition of the system. The fuel flow rate herein is obtained using the target fuel flow rate F_fuel (the object computed in this step) according to the present embodiment.

The heat flow h_exh [W/mol/s] per unit flow rate of the combustion gas can be estimated on the basis of the anode discharged gas concentration estimated in step S120 and the target temperature (target combustion temperature) of the combustion gas of the discharged gas combustor 41 on the premise of complete combustion.

The heat flow H_anodegas [W] of the anode discharged gas is estimated by computing the aforementioned Formula (3). However, according to the present embodiment, the formula is set such that the target fuel flow rate F_fuel to be computed is included in the discharged gas flow rate F_exh.

The flow rate ratio α between the fuel and the anode discharged gas is a ratio between the fuel flow rate supplied from the fuel tank 21 to the fuel supply passage 20 and the flow rate of the anode discharged gas at the stack outlet of the fuel cell stack 1. The fuel flow rate is obtained using the target fuel flow rate F_fuel (the object computed in this step) according to the present embodiment. The flow rate of the anode discharged gas can be estimated from the anode discharged gas concentration estimated in step S120.

The heat flow h_anodegas per unit flow rate of the anode discharged gas can be estimated from the anode discharged gas temperature and the anode discharged gas concentration estimated in step S120. According to the present embodiment, the anode discharged gas temperature is obtained using a predetermined value arbitrarily set similarly to step S110.

In this manner, the target fuel flow rate F_fuel can be estimated by using Formula (4) on the basis of the heat flow H_anodegas of the anode discharged gas estimated in Formula (3).

The target fuel flow rate F_fuel [mol/s] does not necessarily have to be obtained from Formulas (3) and (4) using enthalpy. For example, it may be obtained from the following Formula (6) using the anode discharged gas concentration f_anodegas, the discharged gas flow rate F_exh [mol/s], a specific heat Cp_exh of the discharged gas, and a difference ΔT between the target combustion temperature and a mixed gas temperature.

[Formula 6]

$$F\_fuel * f\_anodegas = F\_exh * C_{p\_exh} \Delta T \qquad (6)$$

In Formula (6), the value estimated in step S120 is used as the anode discharged gas concentration f_anodegas.

The discharged gas flow rate F_exh is the gas flow rate after combustion by the discharged gas combustor 41, similarly to Formula (3), and is calculated from the cathode gas flow rate F_air and the fuel flow rate on the premise of complete combustion. As described above, according to the present embodiment, the cathode gas flow rate F_air is obtained using a predetermined value arbitrarily set depending on the operating condition of the system.

The specific heat Cp_exh of the discharged gas is a fixed value determined from the gas composition after combustion by the discharged gas combustor 41. The gas composition may be estimated from the raw fuel.

ΔT is a difference between the target value of the combustion gas temperature (target combustion temperature) in the discharged gas combustor 41 and the temperature of the mixed gas (mixed gas temperature) of the anode and cathode discharged gases at the outlet of the fuel cell stack 1. The target combustion temperature is set depending on the operating condition of the system, and the system performs control such that the discharged gas combustor 41 reaches the target combustion temperature. According to the present embodiment, as described above, the anode discharged gas temperature and the cathode discharged gas temperature are estimated as the equivalent value, and the mixed gas temperature is obtained using a predetermined value arbitrarily set depending on the operating condition as the cathode discharged gas temperature.

As described above, the target fuel flow rate F_fuel may also be estimated using Formula (6) on the basis of the anode discharged gas concentration (composition of the anode discharged gas) estimated in step S120.

If the target fuel flow rate F_fuel is computed in step S130, the controller 5 performs control in step S140 such that the raw fuel is supplied from the fuel tank 21 to the fuel supply passage 20 on the basis of the computed target fuel flow rate F_fuel.

If the raw fuel is supplied on the basis of the target fuel flow rate F_fuel in step S140, the fuel cell system 100 starts the combustion gas temperature control again and returns to step S110.

With the fuel cell system 100 according to the first embodiment described above, the following effects can be obtained.

In the fuel cell system 100, the anode discharged gas concentration (composition of the anode discharged gas) is estimated on the basis of at least one of the current value and the POX flow rate of the fuel cell stack 1. In addition, the temperature of the discharged gas combustor 41 (combustor) is controlled by adjusting the flow rate of the raw fuel using the pump and the injector 23 (fuel flow rate control unit) on the basis of the estimated anode discharged gas concentration. As described above, in the fuel cell system 100, the temperature of the discharged gas combustor 41 is controlled without using a temperature sensor that detects the temperature of the combustion gas of the discharged gas combustor 41. Therefore, the temperature of the discharged gas combustor 41 can be controlled even when the combustion gas temperature becomes high.

In addition, in the fuel cell system 100, the temperature of the discharged gas combustor 41 (combustor) is controlled by adjusting the fuel flow rate (flow rate of the raw fuel) on the basis of the composition of the anode discharged gas instead of the raw fuel. In the fuel cell system, the composition or an amount of heat is changed by reforming the fuel in the reformer or supplying oxygen by the POX reaction. For this reason, the compositions or the amounts of heat are different between the raw fuel and the anode discharged gas supplied to the discharged gas combustor 41. Therefore, when the temperature of the combustor is controlled by adjusting the fuel flow rate on the basis of the composition of the raw fuel, it is difficult to accurately control the temperature of the combustor. In contrast, in the fuel cell system 100 according to the present embodiment, the temperature of the discharged gas combustor 41 (combustor) is controlled by estimating the composition of the anode discharged gas and adjusting the fuel flow rate on the basis of the estimated composition of the anode discharged gas. For this reason, it is possible to accurately control the temperature of the discharged gas combustor 41, compared to a case where the fuel flow rate is adjusted on the basis of the composition of the raw fuel. Therefore, it is possible to prevent deterioration of the combustion catalyst (for example, sintering) caused by an excessively high combustion gas temperature, degradation of startability or power generation performance of the fuel cell caused by an excessively low combustion gas temperature, and the like.

Second Embodiment

A fuel cell system 100 according to a second embodiment will be described with reference to FIG. 3. Note that like reference numerals denote like elements as in the first embodiment, and they will not be described repeatedly.

The present embodiment is different from the first embodiment in that the anode gas temperature (temperature of the reformed raw fuel) is sometimes used in estimation of the anode discharged gas concentration (composition of the anode discharged gas), and a detection value is used for the anode discharged gas temperature used in estimation of the anode discharged gas concentration.

Figure 3:
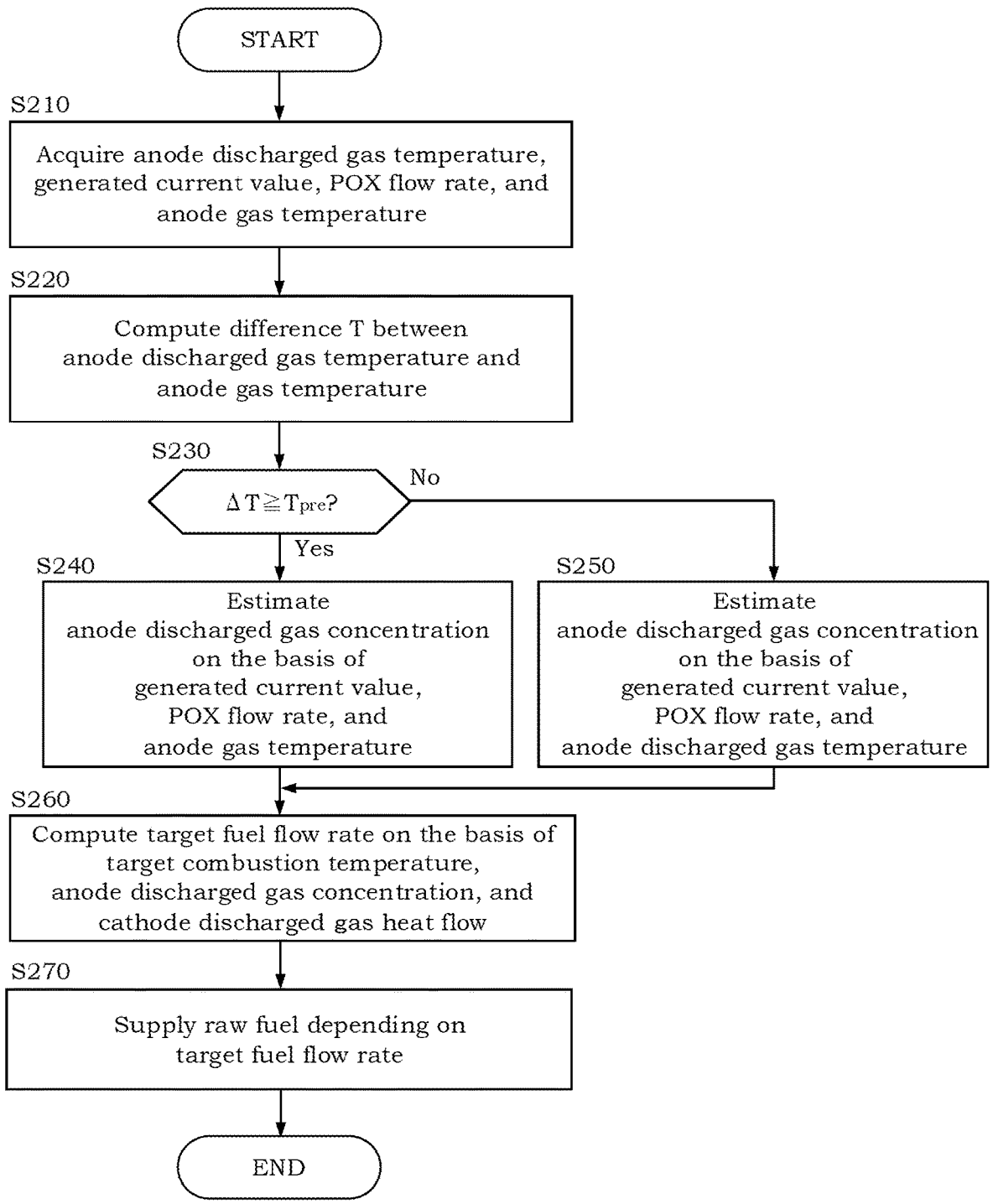
FIG. 3 is a flowchart illustrating combustion gas temperature control of a fuel cell system according to a second embodiment.

FIG. 3 is a flowchart illustrating combustion gas temperature control of the fuel cell system 100 according to the second embodiment. Note that all of the following controls are executed by the controller 5.

As the fuel cell system 100 starts the combustion gas temperature control, the controller 5 acquires an anode discharged gas temperature, a generated current value, a POX flow rate, and an anode gas temperature (temperature of the reformed raw fuel) in step S210.

The anode discharged gas temperature is detected by the temperature sensor 401 (anode discharged gas temperature detecting means) provided in the anode discharged gas passage 42. A signal of the detection value is transmitted to the controller 5, and the controller 5 receives the signal.

The generated current value is a detection value detected by the current sensor 101 provided in the fuel cell stack 1, or the target value of the generated current set depending on the operating condition of the system. The controller 5 receives the signal of the detection value or acquires a set target value as the generated current.

The POX flow rate is a detection value detected by the flow rate sensor 302 provided in the POX pipe 32, or an estimation value estimated from the cathode gas flow rate, the opening degree of the throttle 321, and the pressure loss caused by the POX pipe 32. The controller 5 receives the signal of the detection value or acquires a set target value as the POX flow rate.

The anode gas temperature is a temperature of the reformed raw fuel (cathode gas) supplied from the reformer 26 to the fuel cell stack 1. The anode gas temperature is detected by the temperature sensor 202 (reformed gas temperature detecting means) provided at a position between the reformer 26 and the fuel cell stack 1. The detection value is transmitted to the controller 5 as a signal, and the controller 5 receives the signal.

Next, in step S220, the controller 5 computes a difference $\Delta T$ between the anode discharged gas temperature and the anode gas temperature acquired in step S210.

Subsequently, in step S230, it is determined whether or not the difference $\Delta T$ between the anode discharged gas temperature and the anode gas temperature is equal to or greater than a predetermined value T_pre. The predetermined value T_pre is the minimum value of the temperature difference between the reformer 26 and the fuel cell stack 1 when the composition of the anode discharged gas depends on the temperature of the reformer 26.

During the warm-up operation such as at startup, a device smaller than the fuel cell stack 1 such as the reformer 26 is warmed up earlier than the fuel cell stack 1. Therefore, during the warm-up operation, the fuel cell stack 1 is in a low temperature state, and the reformer 26 is in a high temperature state until a certain period of time elapses. In this case, the difference $\Delta T$ between the temperature of the fuel cell stack 1 ($\approx$anode discharged gas temperature) and the temperature of the reformer 26 ($\approx$anode gas temperature) is large. In this state, the catalyst in the fuel cell stack 1 does not function, and the composition of the anode discharged gas depends on the temperature of the reformer 26. Meanwhile, after the fuel cell stack 1 reaches a certain temperature, the difference $\Delta T$ between the temperature of the fuel cell stack 1 ($\approx$anode discharged gas temperature) and the temperature of the reformer 26 ($\approx$anode gas temperature) is reduced, and the anode discharged gas composition depends on the temperature of the fuel cell stack 1.

Therefore, when the difference $\Delta T$ between the anode discharged gas temperature and the anode gas temperature is equal to or greater than the predetermined value T_pre, the composition of the anode discharged gas depends on the temperature of the reformer 26 ($\approx$anode gas temperature). Meanwhile, when $\Delta T$ is smaller than the predetermined value T_pre, the composition of the anode discharged gas depends on the temperature of the fuel cell stack 1 ($\approx$anode discharged gas temperature).

In step S230, if the controller 5 determines that $\Delta T$ is equal to or greater than the predetermined value T_pre, the controller 5 advances to step S240.

In step S240, the controller 5 estimates the anode discharged gas concentration (anode discharged gas composition) on the basis of the generated current value, the POX flow rate, and the anode gas temperature acquired in S210. As described above, when $\Delta T$ is equal to or greater than the predetermined value T_pre, the composition of the anode discharged gas depends on the temperature of the reformer 26 ($\approx$anode gas temperature). Therefore, the anode gas discharged gas concentration is estimated on the basis of the anode gas temperature.

Specifically, the anode discharged gas concentration can be estimated from the composition of the raw fuel, the amount of oxygen supplied to the fuel, and the anode gas temperature by using the equilibrium composition or the reaction rate formula, similarly to step S120 of the first embodiment. In addition, the anode discharged gas concentration may also be estimated by actual machine evaluation based on experiments. Note that, according to the present embodiment, the anode discharged gas temperature used for estimating the anode discharged gas concentration is obtained using the detection value detected by the temperature sensor 202 provided at a position between the reformer 26 and the fuel cell stack 1.

If the anode discharged gas concentration is estimated in step S240, the controller 5 advances to step S260.

Meanwhile, if the difference $\Delta T$ between the anode discharged gas temperature and the anode gas temperature is determined to be smaller than the predetermined value T_pre in step S230, the controller 5 advances to step S250.

In step S250, the controller 5 estimates the anode discharged gas concentration (composition of the anode discharged gas) on the basis of the anode discharged gas temperature, the generated current value, and the POX flow rate acquired in step S210. Note that, according to the present embodiment, the anode discharged gas temperature used for estimating the anode discharged gas concentration is obtained using the detection value detected by the sensor 401 provided in the anode discharged gas passage 42. Therefore, it is possible to estimate the anode discharged gas concentration more accurately, compared to a case where the anode discharged gas temperature is set to an arbitrary predetermined value.

Similarly to step S120 of the first embodiment, the anode discharged gas concentration may be estimated using the equilibrium composition or the reaction rate formula. In addition, the anode discharged gas concentration may also be estimated using actual machine evaluation based on experiments.

If the anode discharged gas concentration is estimated in step S250, the controller 5 advances to step S260.

In step S260, the controller 5 computes the target fuel flow rate F_fuel such that the combustion temperature of the combustion gas of the discharged gas combustor 41 becomes the target combustion temperature. The target fuel flow rate F_fuel is computed, for example, on the basis of the target combustion temperature, the anode discharged gas concentration, and the heat flow of the cathode discharged gas, similarly to step S130 of the first embodiment.

If the target fuel flow rate F_fuel is computed in step S260, the controller 5 performs control such that the raw fuel is supplied from the fuel tank 21 to the fuel supply passage 20 on the basis of the computed target fuel flow rate F_fuel in step S270.

If the raw fuel is supplied on the basis of the target fuel flow rate F_fuel in step S270, the fuel cell system 100 starts the combustion gas temperature control again and returns to step S210.

With the fuel cell system 100 according to the second embodiment described above, it is possible to further obtain the following effects.

The fuel cell system 100 according to the present embodiment estimates the anode discharged gas concentration (composition of the anode discharged gas) on the basis of the anode discharged gas temperature detected by the temperature sensor 401 (anode discharged gas temperature detecting means), the generated current value (current value), and the POX flow rate. Therefore, compared to a case where the anode discharged gas temperature is obtained using a predetermined value arbitrarily set, it is possible to improve estimation accuracy of the anode discharged gas concentration. As a result, the accuracy of the combustor temperature control based on the anode discharged gas concentration is improved, so that it is possible to more reliably prevent deterioration of the combustion catalyst (for example, sintering) caused by an excessively high combustion gas temperature, degradation of startability or power generation performance of the fuel cell caused by an excessively low combustion gas temperature, and the like.

In addition, the fuel cell system 100 according to the present embodiment estimates the composition of the anode discharged gas on the basis of the anode gas temperature, the current value, and the POX flow rate when the difference between the anode discharged gas temperature and the anode gas temperature (temperature of the reformed raw fuel) is equal to or greater than the predetermined value T_pre. When the difference ΔT between the temperature of the fuel cell stack 1 (≈anode discharged gas temperature) and the temperature of the reformer 26 (≈anode gas temperature) is equal to or greater than the predetermined value T_pre, the catalyst in the fuel cell stack 1 does not function, and the composition of the anode discharged gas depends on the temperature of the reformer 26. For this reason, according to the present embodiment, when the difference between the anode discharged gas temperature and the anode gas temperature is equal to or greater than the predetermined value T_pre, the composition of the anode discharged gas is estimated on the basis of the anode gas temperature. As a result, it is possible to accurately control the combustion gas temperature even when the fuel cell stack 1 is in a low temperature state as in the warm-up operation.

Third Embodiment

A fuel cell system 100 according to a third embodiment will be described with reference to FIG. 4. Note that like reference numerals denote like elements as in the first and second embodiments, and they will not be described repeatedly.

The present embodiment is different from the other embodiments in that the heat flow of the anode discharged gas is estimated on the basis of the detection value of the fuel flow rate and the composition of the anode discharged gas.

Figure 4:
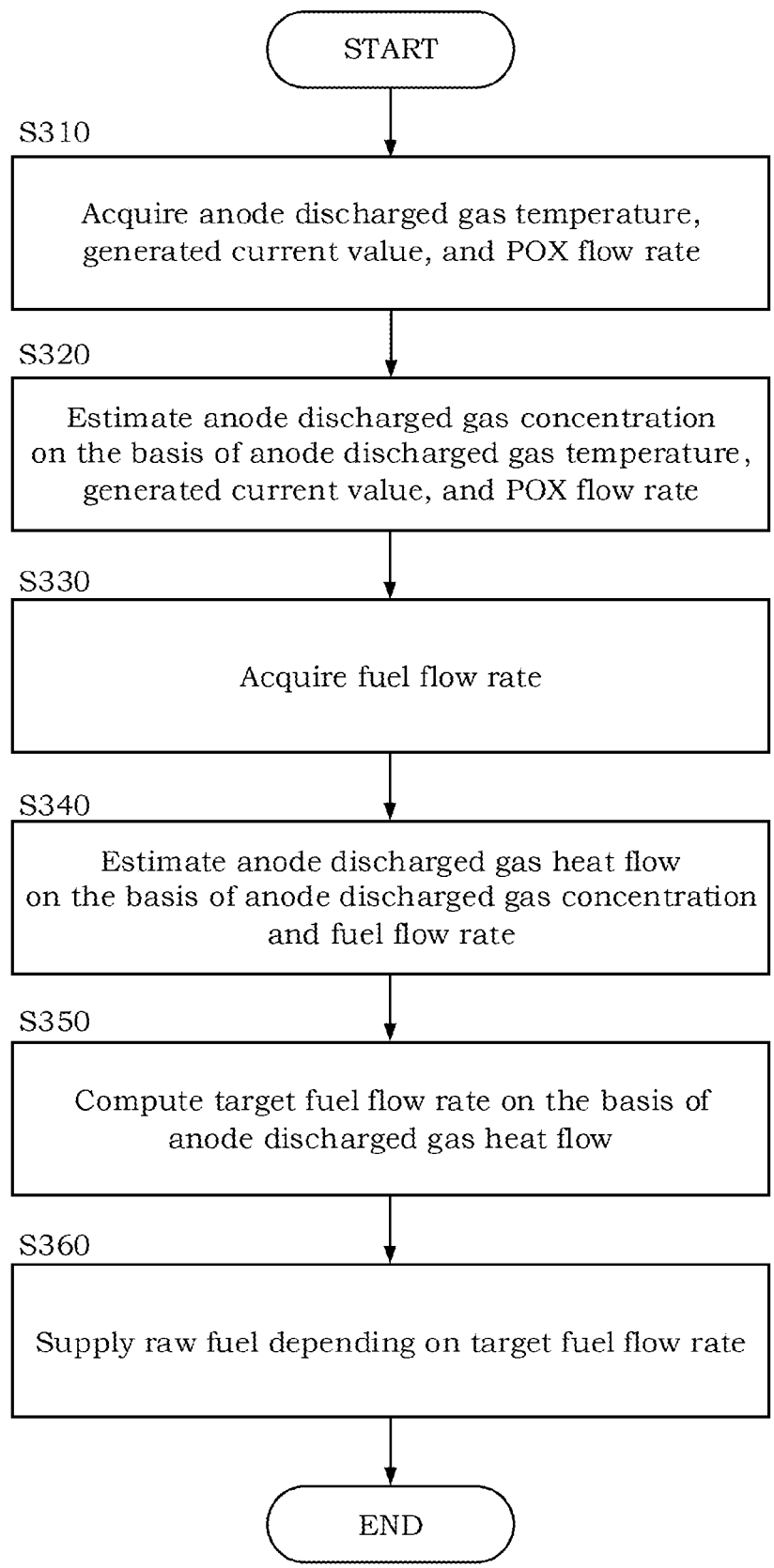
FIG. 4 is a flowchart illustrating combustion gas temperature control of a fuel cell system according to a third embodiment.

FIG. 4 is a flowchart illustrating combustion gas temperature control of the fuel cell system 100 according to the third embodiment. Note that all of the following controls are executed by the controller 5.

Similarly to steps S110 and S120 of the first embodiment, the anode discharged gas temperature, the generated current value, and the POX flow rate are acquired in step S310, and the anode discharged gas concentration is estimated in step S320.

In step 330, the controller 5 acquires the fuel flow rate. The fuel flow rate is a flow rate of the fuel supplied from the fuel tank 21 to the fuel supply passage 20. The fuel flow rate is detected by the flow rate sensor 201 provided at a position between the fuel tank 21 and the branching passage 22 in the fuel supply passage 20. The detection value is transmitted to the controller 5 as a signal, and the controller 5 receives the signal.

In step 340, the controller 5 estimates the anode discharged gas heat flow on the basis of the anode discharged gas concentration estimated in step S320 and the fuel flow rate acquired in step S330. The estimation of the anode discharged gas heat flow may be calculated using enthalpy, for example, as shown below.

For example, considering steam reforming of methane, the following chemical reaction formula (Formula (7)) is given. Note that, in Formula (7), "a", "b", "c", and "d" denote the concentrations of respective compositions.

[Formula 7]

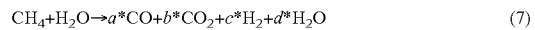

$$CH_4 + H_2O \rightarrow a^*CO + b^*CO_2 + c^*H_2 + d^*H_2O \tag{7}$$

In step S320, the anode discharged gas concentrations (a, b, c, and d) are estimated. In addition, since the fuel flow rate (total amount of $CH_4$ and $H_2O$) is acquired in step S330, the flow rates of respective compositions can be estimated from the mass balance. As a result, the enthalpy per unit flow rate of each composition can be estimated, and the heat flow of the anode discharged gas (enthalpy of the anode discharged gas) H_anodegas [W] can be estimated from a total sum of enthalpy per unit flow rate of each composition as shown in the following Formula (8). Note that "h_CO", "h_CO$_2$", "h_H$_2$", and "h_H$_2$O" in Formula (8) denote the enthalpies [W/mol/s] of CO, CO$_2$, H$_2$, and H$_2$O per unit flow rate, respectively.

[Formula 8]

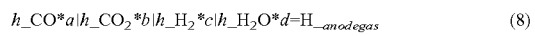

$$h\_CO^*a | h\_CO_2^*b | h\_H_2^*c | h\_H_2O^*d = H_{\_anodegas} \tag{8}$$

The heat flow H_anodegas [W] of the anode discharged gas may also be estimated using specific heats of each composition.

Next, in step S350, similarly to the first embodiment, the controller 5 computes the target fuel flow rate F_fuel [mol/s] such that the combustion temperature of the combustion gas of the discharged gas combustor 41 becomes the target combustion temperature. Here, since the heat flow of the anode discharged gas has been already estimated in step S340, the target fuel flow rate F_fuel can be determined using only Formula (4).

Note that the fuel flow rate at the flow rate ratio α between the fuel and the anode discharged gas can be obtained using the detection value of the flow rate sensor 201 acquired in step S330.

If the target fuel flow rate F_fuel is computed in step S350, the controller 5 performs control such that the raw fuel is supplied from the fuel tank 21 to the fuel supply passage 20 on the basis of the computed target fuel flow rate F_fuel in step S360.

If the raw fuel is supplied on the basis of the target fuel flow rate F_fuel in step S360, the fuel cell system 100 starts the combustion gas temperature control again and returns to step S310.

In this manner, according to the present embodiment, the target fuel flow rate F_fuel is determined on the basis of the heat flow of the anode discharged gas estimated on the basis of the anode discharged gas concentration and the fuel flow rate.

With the fuel cell system 100 according to the third embodiment described above, it is possible to further obtain the following effects.

The fuel cell system 100 according to the present embodiment detects the fuel flow rate (flow rate of the raw fuel) and estimates the anode discharged gas heat flow on the basis of the anode discharged gas concentration (composition of the anode discharged gas) estimated from the anode discharged gas temperature, the current value, and the POX flow rate and the detection value of the fuel flow rate. In addition, the temperature of the combustor is controlled by adjusting the flow rate of the raw fuel using the fuel flow rate control unit on the basis of the estimated anode discharged gas heat flow. In this manner, since the flow rate of the raw fuel is adjusted on the basis of the anode discharged gas heat flow estimated using the detection value of the fuel flow rate, the accuracy of the temperature control of the combustor is further improved. Therefore, it is possible to more reliably prevent deterioration of the combustion catalyst (for example, sintering) caused by an excessively high combustion gas temperature, degradation of startability or power generation performance of the fuel cell caused by an excessively low combustion gas temperature, and the like.

Fourth Embodiment

A fuel cell system 100 according to a fourth embodiment will be described with reference to FIG. 5. Note that like reference numerals denote like elements as in the other embodiments, and they will not be described repeatedly.

The present embodiment is different from the other embodiments in that the flow rate of the cathode gas and the cathode discharged gas temperature are detected, and the cathode gas heat amount is estimated on the basis of these detected values.

Figure 5:
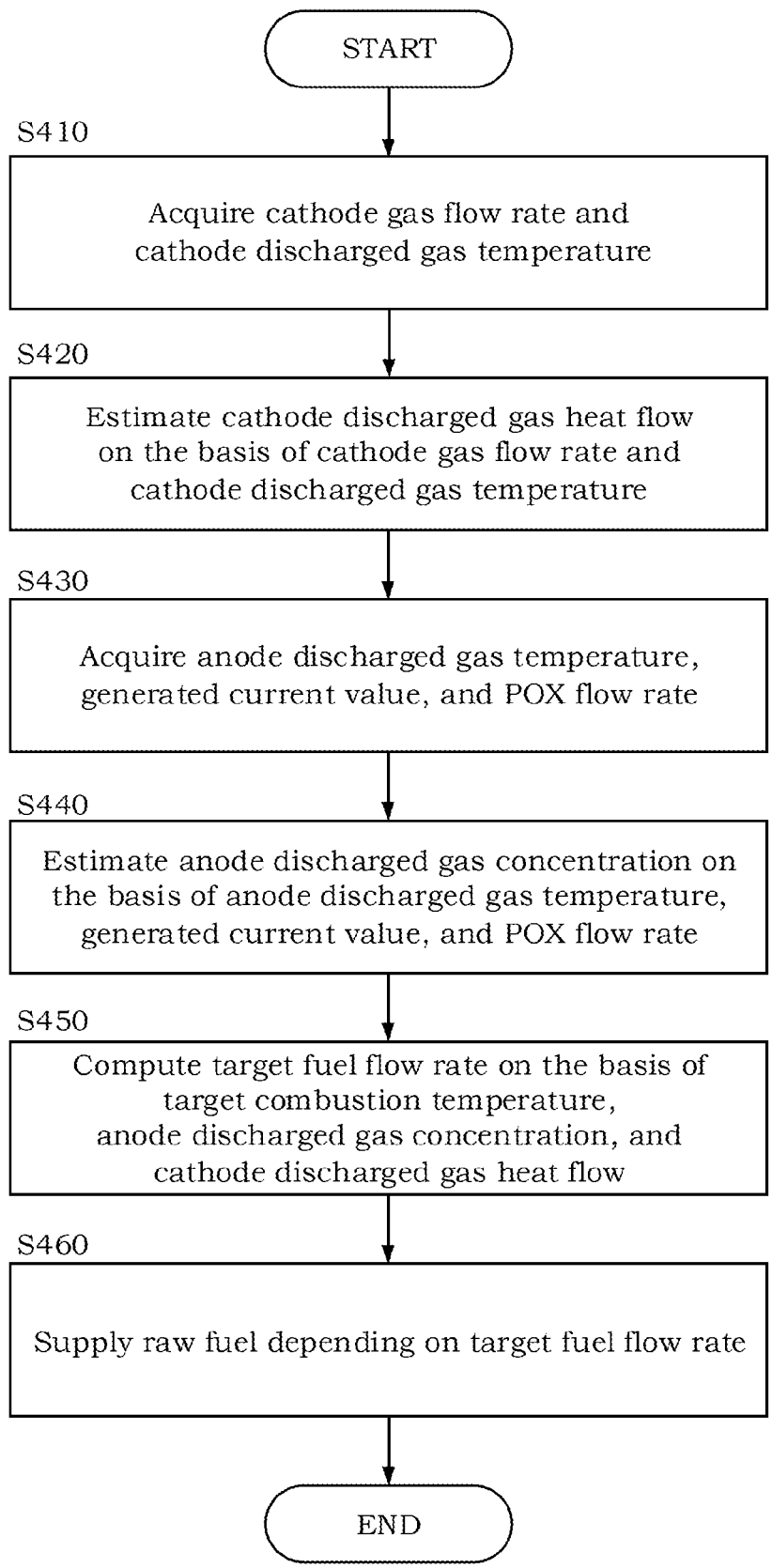
FIG. 5 is a flowchart illustrating combustion gas temperature control of a fuel cell system according to a fourth embodiment.

FIG. 5 is a flowchart illustrating combustion gas temperature control of the fuel cell system 100 according to the fourth embodiment. Note that all of the following controls are executed by the controller 5.

As the fuel cell system 100 starts the combustion gas temperature control, the controller 5 acquires the cathode gas flow rate and the cathode discharged gas temperature in step S410.

The cathode gas flow rate is detected by the flow rate sensor 301 provided in the air supply passage 30. The detection value is transmitted to the controller 5 as a signal, and the controller 5 receives the signal.

The cathode discharged gas temperature is detected by the temperature sensor 402 (cathode discharged gas temperature detecting means) provided in the cathode discharged gas passage 43. The detection value is transmitted to the controller 5 as a signal, and the controller 5 receives the signal. Note that it is preferable that the cathode discharged gas temperature is obtained using the detection value. Instead, the cathode discharged gas temperature may also be obtained using a predetermined value arbitrarily set depending on the operating condition of the system.

Next, in step S420, the controller 5 estimates the cathode discharged gas heat flow H_cathodegas [W] on the basis of the cathode gas flow rate and the cathode discharged gas temperature acquired in step S410.

The estimation of the cathode discharged gas heat flow H_cathodegas [W] can be obtained from the aforementioned Formula (5) that uses the cathode gas flow rate F_air [mol/s], the specific heat of air Cp_air, and the temperature rise $\Delta T$. However, here, the cathode gas flow rate F_air is obtained using the detection value of the flow rate sensor 301 acquired in step S410. In addition, while the temperature rise $\Delta T$ is a value obtained by subtracting the air temperature from the cathode discharged gas temperature, the detection value of the temperature sensor 402 acquired in step S410 is used as the cathode discharged gas temperature.

Note that it is preferable that the detection value of the temperature sensor 402 is used as the cathode discharged gas temperature in the calculation of the temperature rise $\Delta T$, but the invention is not limited thereto. For example, a predetermined value arbitrarily set depending on the operating condition of the system or the detection value of the temperature sensor 401 that detects the anode discharged gas temperature may also be used.

In addition, similarly to the anode discharged gas heat flow H_anodegas [W], the estimation of the cathode discharged gas heat flow H_cathodegas [W] may be obtained from enthalpy. Specifically, the cathode discharged gas heat flow H_cathodegas [W] may be obtained from the following Formula (9) using the cathode gas flow rate F_air [mol/s] and the heat flow h_cathodegas [W/mol/s] per unit flow rate of the cathode discharged gas.

[Formula 9]

$$H_{\_cathodegas} = F_{\_air} * h_{\_cathodegas} \quad (9)$$

The cathode gas flow rate F_air [mol/s] is obtained using the detection value of the flow rate sensor 301 acquired in step S410.

The heat flow h_cathodegas [W/mol/s] per unit flow rate of the cathode discharged gas can be estimated from the temperature of the cathode discharged gas and the cathode gas flow rate. The temperature of the cathode discharged gas and the cathode gas flow rate can be obtained using the detection value of the temperature sensor 402 and the detection value of the flow rate sensor 301 acquired in step S410, respectively If the cathode discharged gas heat flow H_cathodegas [W] is estimated in step S420, similarly to step S110 of the first embodiment, the controller 5 acquires the anode discharged gas temperature, the generated current value, and the POX flow rate in step S430.

Then, in step S440, the controller 5 estimates the anode discharged gas concentration, similarly to step S120 of the first embodiment.

Then, similarly to step S130, the controller 5 computes the target fuel flow rate F_fuel [mol/s] on the basis of the target combustion temperature, the anode discharged gas concentration, and the heat flow of the cathode discharged gas in step S450 such that the combustion temperature of the combustion gas of the discharged gas combustor 41 becomes the target combustion temperature. Note that, according to the present embodiment, the value estimated from the detection value in step S420 is used as the heat flow of the cathode off-gas H_cathodegas, instead of giving a predetermined value. In this manner, since the target fuel flow rate F_fuel is computed on the basis of the cathode discharged gas heat flow H_cathodegas estimated from the detection value, the accuracy of the temperature control of the discharged gas combustor 41 is further improved.

Note that, similarly to the third embodiment, the anode discharged gas heat flow H_anodegas [W] may be estimated on the basis of the anode discharged gas concentration and the detection value of the fuel flow rate, and the target fuel flow rate F_fuel may be computed using the estimated anode discharged gas heat flow H_anodegas. That is, the target fuel flow rate F_fuel may also be computed on the basis of the cathode discharged gas heat flow H_cathodegas estimated in step S420 and the anode discharged gas heat flow H_anodegas estimated on the basis of the anode discharged gas concentration and the detection value of the fuel flow rate.

If the target fuel flow rate F_fuel is computed in step S450, the controller 5 performs control in step S460 such that the raw fuel is supplied from the fuel tank 21 to the fuel supply passage 20 on the basis of the computed target fuel flow rate F_fuel.

If the raw fuel is supplied depending on the target fuel flow rate F_fuel in step S460, the fuel cell system 100 starts the combustion gas temperature control again and returns to step S410.

With the fuel cell system 100 according to the fourth embodiment described above, it is possible to further obtain the following effects.

The fuel cell system 100 according to the present embodiment controls the temperature of the discharged gas combustor 41 by estimating the cathode gas heat flow on the basis of the detection value of the cathode gas flow rate and controlling the flow rate of the raw fuel on the basis of the estimated cathode gas heat flow and the composition of the anode discharged gas. In this manner, since the flow rate of the raw fuel is controlled on the basis of the heat flow of the cathode discharged gas estimated from the detection value of the cathode gas flow rate, the accuracy of the temperature control of the combustor is further improved. Therefore, it is possible to more reliably prevent deterioration of the combustion catalyst (for example, sintering) caused by an excessively high combustion gas temperature, degradation of startability or power generation performance of the fuel cell caused by an excessively low combustion gas temperature, and the like.

In addition, the fuel cell system 100 according to the present embodiment estimates the cathode gas heat flow on the basis of the detection value of the cathode discharged gas temperature. Furthermore, the temperature of the discharged gas combustor 41 (combustor) is controlled by controlling the flow rate of the raw fuel on the basis of the estimated cathode gas heat flow and the composition of the anode discharged gas. In this manner, since the flow rate of the raw fuel is controlled on the basis of the heat flow of the cathode discharged gas estimated from the detection value of the cathode discharged gas temperature, the accuracy of the temperature control of the discharged gas combustor 41 is further improved. Therefore, it is possible to more reliably prevent deterioration of the combustion catalyst (for example, sintering) caused by an excessively high combustion gas temperature, degradation of startability or power generation performance caused by an excessively low combustion gas temperature, and the like.

Fifth Embodiment

A fuel cell system 100 according to a fifth embodiment will be described with reference to FIG. 6. Note that like reference numerals denote like elements as in the other embodiments, and they will not be described repeatedly.

The present embodiment is different from the other embodiments in that oxygen transfer during power generation is taken into consideration in estimation of the cathode discharged gas heat flow.

Figure 6:
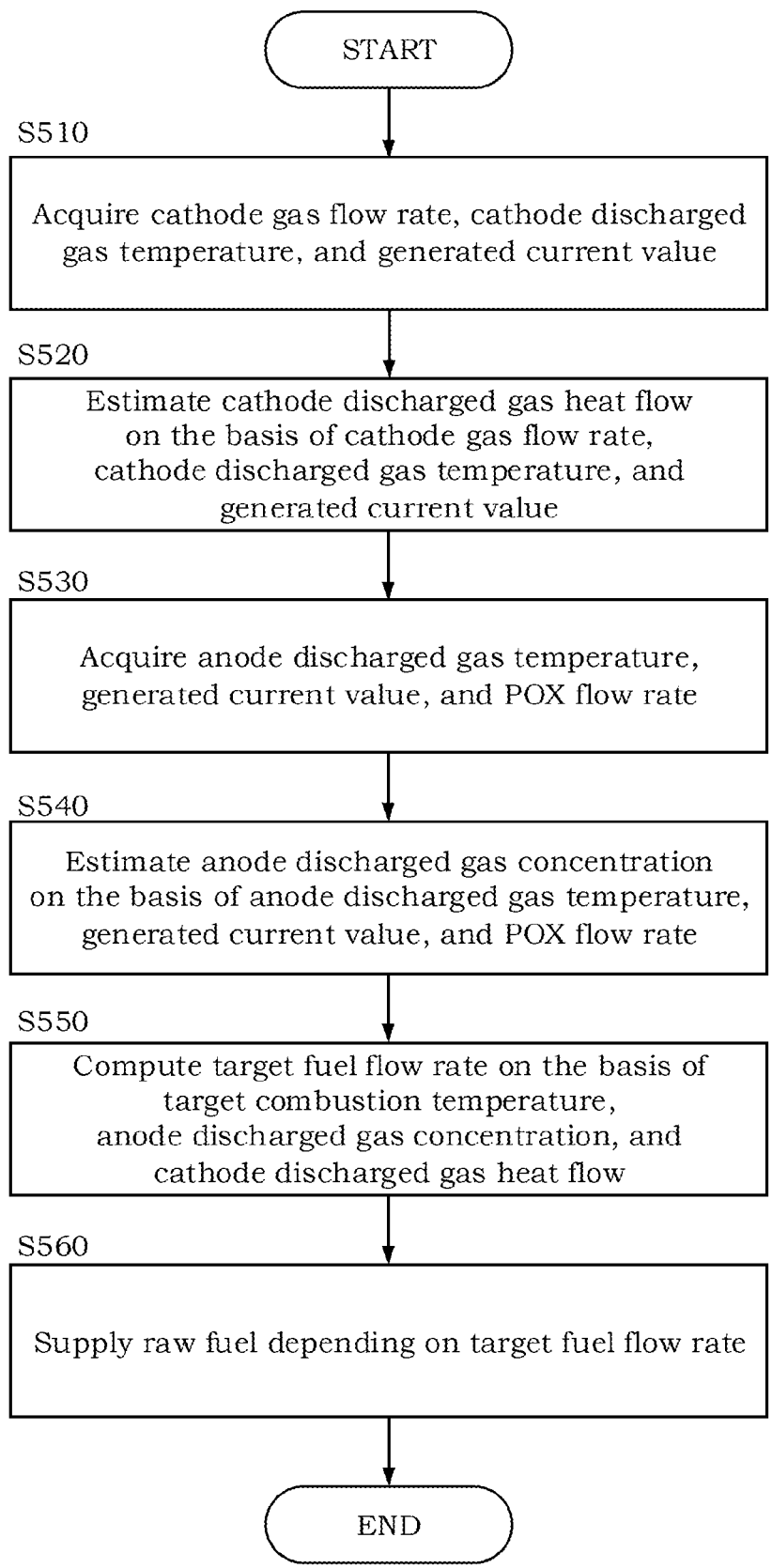
FIG. 6 is a flowchart illustrating combustion gas temperature control of a fuel cell system according to a fifth embodiment.

FIG. 6 is a flowchart illustrating combustion gas temperature control of the fuel cell system 100 according to the fifth embodiment. Note that all of the following controls are executed by the controller 5.

As the fuel cell system 100 starts the combustion gas temperature control, the controller 5 acquires the cathode gas flow rate, the cathode discharged gas temperature, and the generated current value in step S510.

Similarly to the fourth embodiment, the controller 5 acquires the cathode gas flow rate from the detection value of the flow rate sensor 301, and acquires the cathode discharged gas temperature from the detection value of the temperature sensor 402.

The generated current value is detected by the current sensor 101 provided in the fuel cell stack 1. The detection value is transmitted to the controller 5 as a signal, and the controller 5 receives the signal. Note that it is preferable that the detection value is used as the generated current value, but the target value of the generated current set depending on the operating condition of the system may also be used.

Then, in step S520, the controller 5 estimates the cathode discharged gas heat flow H_cathodegas [W] on the basis of the cathode gas flow rate, the cathode discharged gas temperature, and the generated current value acquired in step S510.

While Formula (5) is used in the estimation of the cathode discharged gas heat flow H_cathodegas in the other embodiments, the following Formula (10) in which oxygen transfer during power generation is further taken into consideration is used according to the present embodiment. Note that, in Formula (10), "I" denotes the generated current value, "$\alpha$" denotes a transform coefficient (transform from the current to oxygen), and "Cp_$O_2$" denotes a specific heat of oxygen. In Formula (10), the value of the heat flow is subtracted from the left side of Formula (5) by the amount of oxygen transfer caused by power generation.

[Formula 10]

$$F_{\_air} * C_{\_Pair} * \Delta T - I * \alpha * C_{\_pO2} * \Delta T = H_{\_cathodegas} \quad (10)$$

"I" denotes the generated current value generated by the fuel cell stack 1, and the detection value of the current sensor 101 acquired in step S510 is used as the generated current value. The transform coefficient $\alpha$ and the specific heat of oxygen Cp_$O_2$ are fixed values.

In this manner, in Formula (10), the cathode discharged gas heat flow H_cathodegas is estimated on the basis of the current value generated by the fuel cell stack 1 and the cathode gas flow rate in consideration of a change of the heat flow caused by oxygen transfer during power generation. By taking into consideration the change of the heat flow caused by oxygen transfer during power generation, the estimation accuracy for the cathode discharged gas heat flow is further improved.

Note that the estimation of the cathode discharged gas heat flow H_cathodegas [W] may also be obtained from enthalpy according to the present embodiment. Specifically, the amount of heat from oxygen transfer caused by power generation may be subtracted from the right side in Formula (9).

Similarly to step S110 of the first embodiment, if the cathode discharged gas heat flow H_cathodegas [W] is estimated in step S520, the controller 5 acquires the anode discharged gas temperature, the generated current value, and the POX flow rate in step S530.

Then, the controller 5 estimates the anode discharged gas concentration in step S540 similarly to step S120, and computes the target fuel flow rate F_fuel in step S550 similarly to step S130.

Subsequently, in step S560, the controller 5 supplies the raw fuel on the basis of the target fuel flow rate F_fuel. As the raw fuel is supplied, the fuel cell system 100 starts the combustion gas temperature control again and returns to step S510.

With the fuel cell system 100 according to the fifth embodiment, it is possible to further obtain the following effects.

The fuel cell system 100 according to the present embodiment estimates the cathode gas heat flow on the basis of the detection value of the cathode gas flow rate and the current value generated from the fuel cell stack 1. In addition, the temperature of the discharged gas combustor 41 (combustor) is controlled by controlling the flow rate of the raw fuel on the basis of the estimated cathode gas heat flow and the composition of the anode discharged gas. In this manner, since the cathode gas heat flow is estimated on the basis of the current value, a change of the heat flow caused by oxygen transfer during power generation is taken into consideration, and the estimation accuracy for the cathode discharged gas heat flow is further improved. Since the temperature of the discharged gas combustor 41 is controlled by controlling the flow rate of the raw fuel on the basis of the estimated cathode discharged gas heat flow, the accuracy of the temperature control of the discharged gas combustor 41 is also improved. Therefore, it is possible to more reliably prevent deterioration of the combustion catalyst (for example, sintering) caused by an excessively high combustion gas temperature, degradation of startability or power generation performance of the fuel cell caused by an excessively low combustion gas temperature, and the like.

Sixth Embodiment

Figure 7:
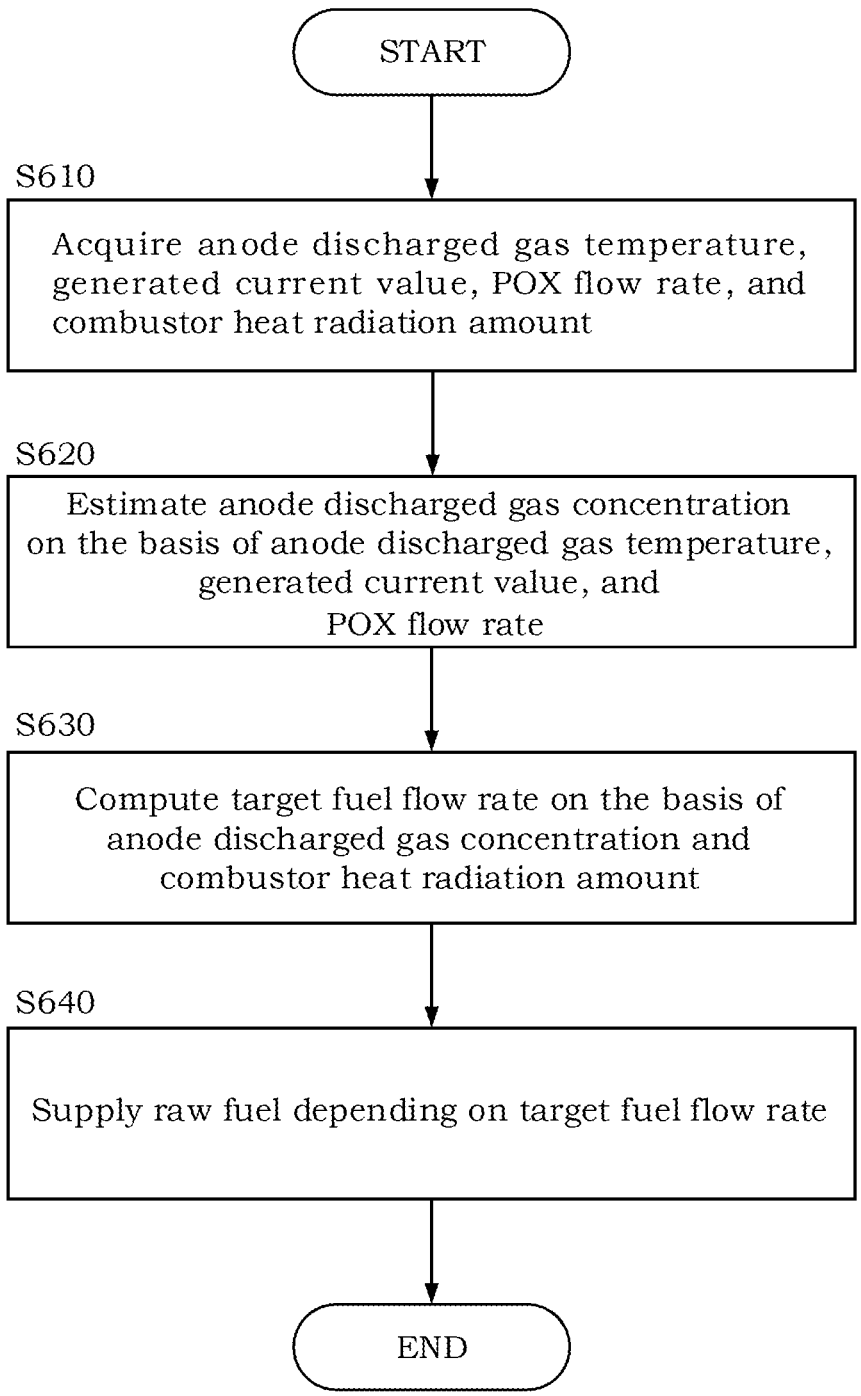
FIG. 7 is flowchart illustrating combustion gas temperature control of a fuel cell system according to a sixth embodiment.

A fuel cell system 100 according to a sixth embodiment will be described with reference to FIG. 7. Note that like reference numerals denote like elements as in the other embodiments, and they will not be described repeatedly.

The present embodiment is different from the other embodiments in that a heat radiation amount from the discharged gas combustor 41 is taken into consideration.

FIG. 6 is a flowchart illustrating combustion gas temperature control of the fuel cell system 100 according to the fifth embodiment. Note that all of the following controls are executed by the controller 5.

As the fuel cell system 100 starts the combustion gas temperature control, the controller 5 acquires the anode discharged gas temperature, the generated current value, the POX flow rate, and a combustor heat radiation amount in step S610.

The anode discharged gas temperature, the generated current value, and the POX flow rate are acquired in the way similar to those of the other embodiments.

The combustor heat radiation amount is an amount of heat radiated from the discharged gas combustor 41 to the outside, and can be determined from a general heat exchange formula or a result of actual machine evaluation based on experiments.

For example, the combustor heat radiation amount Q_heat [W] can be determined from the following Formula (11). Note that, in Formula (11), "h" denotes a thermal resistance [K/W] of the discharged gas combustor 41, "A" denotes a surface area of the discharged gas combustor 41, "T_target" denotes a target combustion temperature, and "T_outside" denotes an ambient temperature.

[Formula 11]

$$Q_{\_heat} = h^* A^* (T_{target} - T_{outside}) \quad (11)$$

If the anode discharged gas temperature, the generated current value, the POX flow rate, and the combustor heat radiation amount are acquired in step S610, the controller 5 estimates the anode discharged gas concentration (composition of the anode discharged gas) in step S620. Similarly to the other embodiments, the anode discharged gas concentration can be estimated from the composition of the raw fuel, the amount of oxygen supplied to the fuel, and the anode discharged gas temperature on the basis of the anode discharged gas temperature, the generated current value, and the POX flow rate.

Then, in step S630, the controller 5 computes the target fuel flow rate F_fuel [mol/s] such that the combustion temperature of the combustion gas of the discharged gas combustor 41 becomes the target combustion temperature. The target fuel flow rate F_fuel can be obtained, for example, from the following Formula (12) on the basis of the anode discharged gas concentration and the combustor heat radiation amount.

[Formula 12]

$$F_{\_fuel} * f_{\_anodegas} - Q_{heat} = F_{\_exn} * C_{p\_exh} * \Delta T \quad (12)$$

In Formula (12), by subtracting the combustor heat radiation amount Q_heat [W] from the left side of Formula (6), the target fuel flow rate F_fuel is determined in consideration of the combustor heat radiation amount Q_heat.

With the fuel cell system 100 according to the sixth embodiment described above, it is possible to further obtain the following effects.

The fuel cell system 100 according to the present embodiment controls the temperature of the discharged gas combustor 41 by controlling the flow rate of the raw fuel on the basis of the anode discharged gas concentration and the heat radiation amount from the discharged gas combustor 41 to the outside. That is, the heat radiation amount from the discharged gas combustor 41 to the outside is taken into consideration when the target fuel flow rate for controlling the discharged gas combustor 41 to reach the target temperature is computed. Therefore, compared to a case where the temperature of the discharged gas combustor 41 is controlled on the basis of the target fuel flow rate computed without considering the heat radiation amount, it is possible to more accurately control the temperature of the discharged gas combustor 41. Therefore, it is possible to more reliably prevent deterioration of the combustion catalyst (for example, sintering) caused by an excessively high combustion gas temperature, degradation of startability or power generation performance of the fuel cell caused by an excessively low combustion gas temperature, and the like.

While the embodiments of the present invention have been described hereinbefore, the aforementioned embodiments are merely described as a part of the application examples of the present invention, and are not intended to limit the technical scope of the present invention to specific configurations of the aforementioned embodiments.

Each of the aforementioned embodiments may be combined as appropriate although they are described as individual embodiments.

The invention claimed is:

1. A method of controlling a fuel cell system having a fuel cell stack, a reformer configured to reform a raw fuel and supply the reformed raw fuel to the fuel cell stack, a fuel flow rate control unit configured to control a flow rate of the raw fuel supplied to the reformer, an air supply pipe configured to supply oxygen to the raw fuel, and a combustor configured to mix a cathode discharged gas and an anode discharged gas discharged from the fuel cell stack and combust the mixed gas, the method comprising:

detecting at least one of a current value generated from the fuel cell stack and an oxygen supply amount supplied from the air supply pipe;

estimating a composition of the anode discharged gas on the basis of at least one of the current value and the oxygen supply amount; and controlling a temperature of the combustor by adjusting the flow rate of the raw fuel using the fuel flow rate control unit on the basis of the estimated composition of the anode discharged gas.

2. The method of controlling the fuel cell system according to claim 1, further comprising detecting a temperature of the anode discharged gas discharged from the fuel cell stack, wherein the composition of the anode discharged gas is estimated on the basis of the anode discharged gas temperature, the current value, and the oxygen supply amount.

3. The method of controlling the fuel cell system according to claim 1, further comprising detecting a temperature of the anode discharged gas discharged from the fuel cell stack and a temperature of the reformed raw fuel supplied to the fuel cell stack, wherein the composition of the anode discharged gas is estimated on the basis of the temperature of the reformed raw fuel, the current value, and the oxygen supply amount when a difference between the temperature of the anode discharged gas and the temperature of the reformed raw fuel is equal to or greater than a predetermined value, and the composition of the anode discharged gas is estimated from the anode discharged gas temperature, the current value, and the oxygen supply amount when the difference between the temperature of the anode discharged gas and the temperature of the reformed raw fuel is smaller than the predetermined value.

4. The method of controlling the fuel cell system according to claim 1, further comprising:

detecting a flow rate of the raw fuel; and estimating an anode discharged gas heat flow on the basis of the flow rate of the raw fuel and the composition of the anode discharged gas, wherein the temperature of the combustor is controlled by adjusting the flow rate of the raw fuel using the fuel flow rate control unit on the basis of the anode discharged gas heat flow.

5. The method of controlling the fuel cell system according to claim 1, further comprising:

detecting a flow rate of a cathode gas supplied to the fuel cell stack; and estimating a cathode gas heat flow on the basis of the cathode gas flow rate, wherein the temperature of the combustor is controlled by controlling the flow rate of the raw fuel on the basis of the estimated cathode gas heat flow and the composition of the anode discharged gas.

6. The method of controlling the fuel cell system according to claim 5, further comprising detecting a temperature of the cathode discharged gas discharged from the fuel cell stack, wherein the cathode gas heat flow is estimated on the basis of the cathode gas flow rate and the cathode discharged gas temperature.

7. The method of controlling the fuel cell system according to claim 5, wherein the cathode gas heat flow is estimated on the basis of the cathode gas flow rate and a current value generated from the fuel cell stack.

8. The method of controlling the fuel cell system according to claim 1, wherein the temperature of the combustor is controlled by controlling a flow rate of the raw fuel on the basis of a composition of the anode discharged gas and a heat radiation amount from the combustor to outside.

9. A fuel cell system comprising:

a fuel cell stack;

a reformer configured to reform a raw fuel and supply the reformed raw fuel to the fuel cell stack;

a fuel flow rate control unit configured to control a flow rate of the raw fuel supplied to the reformer;

an air supply pipe configured to supply oxygen to the raw fuel;

a combustor configured to mix a cathode discharged gas and an anode discharged gas discharged from the fuel cell stack and combust the mixed gas;

a control unit; and a detecting means configured to detect at least one of a current value generated from the fuel cell stack and an oxygen supply amount supplied from the air supply pipe, wherein the control unit estimates a composition of the anode discharged gas on the basis of at least one of the current value and the oxygen supply amount, and controls a temperature of the combustor by adjusting the flow rate of the raw fuel using the fuel flow rate control unit on the basis of the estimated composition of the anode discharged gas.

\* \* \* \* \*